(12) United States Patent
Brauckmann et al.

(10) Patent No.: US 8,442,967 B2
(45) Date of Patent: May 14, 2013

(54) OPERATOR-ASSISTED ITERATIVE BIOMETRIC SEARCH

(75) Inventors: Michael Brauckmann, Witten (DE); Ernst Mucke, Jersey City, NJ (US); Michael Petrov, Princeton, NJ (US)

(73) Assignee: Identix Incorporated, Bloomington, MN (US)

( * ) Notice: Subject to any disclaimer, the term of this patent is extended or adjusted under 35 U.S.C. 154(b) by 136 days.

(21) Appl. No.: 13/018,261

(22) Filed: Jan. 31, 2011

(65) Prior Publication Data

US 2011/0191329 A1    Aug. 4, 2011

Related U.S. Application Data

(60) Provisional application No. 61/301,405, filed on Feb. 4, 2010.

(51) Int. Cl.
    *G06F 17/30*    (2006.01)
(52) U.S. Cl.
    USPC .......................................................... 707/706
(58) Field of Classification Search .................. 707/2, 3, 707/706; 382/124
    See application file for complete search history.

(56) References Cited

U.S. PATENT DOCUMENTS

| 2004/0042642 A1 | 3/2004 | Bolle et al. |
| 2004/0243567 A1 | 12/2004 | Levy |
| 2006/0153456 A1 | 7/2006 | Foote |
| 2008/0273767 A1* | 11/2008 | Lo et al. ........................ 382/124 |
| 2009/0154795 A1 | 6/2009 | Tan et al. |
| 2009/0174526 A1 | 7/2009 | Howard et al. |

FOREIGN PATENT DOCUMENTS

WO    WO2011/097290    8/2011

OTHER PUBLICATIONS

Taigman et al., "Multiple One-Shots for Utilizing Class Label Information," Proceedings of the British Machine Vision Conference, London, UK, Sep. 7-10, 2009.
International Search Report and Written Opinion for PCT/US2011/23465 mailed Mar. 23, 2011.

* cited by examiner

*Primary Examiner* — Etienne Leroux
(74) *Attorney, Agent, or Firm* — Weaver Austin Villeneuve & Sampson LLP

(57) ABSTRACT

Biometric search methods, apparatus, and systems using operator input for an operator-assisted iterative biometric search are provided. In certain embodiments, a set of candidate records is received at a computing device. At least a first portion of the set of candidate records is displayed. An indication that a first candidate record in the set of candidate records is not a match to the probe record is received. A first search of the set of candidate records using the first candidate record is performed. A score assigned to a second candidate record in the set of candidate records is modified when the second candidate record is more likely to be a match to the first candidate record than a match to the probe record. At least a second portion of the set of candidate records is displayed.

13 Claims, 8 Drawing Sheets

OPERATOR-ASSISTED ITERATIVE BIOMETRIC SEARCH

CROSS-REFERENCE TO RELATED APPLICATION

This application claims benefit under 35 U.S.C. 119(e) to Provisional Application No. 61/301,405, filed Feb. 4, 2010, and titled "METHOD OF OPERATOR-ASSISTED ITERATIVE BIOMETRIC SEARCH." The provisional application is incorporated by reference in its entirety.

BACKGROUND

Biometric recognition technology encompasses fingerprint image recognition, facial image recognition, iris image recognition, ear image recognition, and other techniques. In law enforcement, biometric recognition technology may be used for searches in biometric databases of known criminals in attempts to match crime scene images, latent fingerprint images, or facial images recorded by a security camera, for example, with images in the databases. Searches in a biometric database, known in the industry as a gallery, may be performed using a biometric search engine or matching algorithm that compares an input image with all of the images in the biometric database. The search engine may be installed at a centralized location and shared between different biometric operator workstations that may perform searches with or updates to the biometric database.

SUMMARY

Disclosed are methods, apparatus, and systems for performing an operator-assisted iterative biometric search.

In certain embodiments, a method includes receiving a set of candidate records at a computing device. The set of candidate records includes candidate records that are possible matches to a probe record. Each candidate record in the set of candidate records is assigned a score such that a candidate record that is more likely to be a match to the probe record is assigned a high score and a candidate record that is less likely to be a match to the probe record is assigned a low score. At least a first portion of the set of candidate records, including the candidate records assigned the highest scores, are displayed at a display device of the computing device. An indication that a first candidate record in the set of candidate records is not a match to the probe record is received. A first search of the set of candidate records using the first candidate record is preformed. A score assigned to a second candidate record in the set of candidate records is modified when the second candidate record is more likely to be a match to the first candidate record than a match to the probe record. At least a second portion of the set of candidate records, including the candidate records assigned the highest scores, are displayed at the display device of the computing device.

In certain embodiments, instructions are stored on one or more computer readable media. The instructions include receiving a set of candidate records at a computing device. The set of candidate records includes candidate records that are possible matches to a probe record. Each candidate record in the set of candidate records is assigned a score such that a candidate record that is more likely to be a match to the probe record is assigned a high score and a candidate record that is less likely to be a match to the probe record is assigned a low score. At least a first portion of the set of candidate records, including the candidate records assigned the highest scores, are displayed at a display device of the computing device. An indication that a first candidate record in the set of candidate records is not a match to the probe record is received. A first search of the set of candidate records using the first candidate record is preformed. A score assigned to a second candidate record in the set of candidate records is modified when the second candidate record is more likely to be a match to the first candidate record than a match to the probe record. At least a second portion of the set of candidate records, including the candidate records assigned the highest scores, are displayed at the display device of the computing device.

In certain embodiments, a computing device includes a display device, an input device, and a processor. The processor is configured to receive a set of candidate records. The set of candidate records includes candidate records that are possible matches to a probe record. Each candidate record in the set of candidate records is assigned a score such that a candidate record that is more likely to be a match to the probe record is assigned a high score and a candidate record that is less likely to be a match to the probe record is assigned a low score. At least a first portion of the set of candidate records, including the candidate records assigned the highest scores, are displayed at the display device. An indication that a first candidate record in the set of candidate records is not a match to the probe record is received. A first search of the set of candidate records using the first candidate record is preformed. A score assigned to a second candidate record in the set of candidate records is modified when the second candidate record is more likely to be a match to the first candidate record than a match to the probe record. At least a second portion of the set of candidate records, including the candidate records assigned the highest scores, are displayed at the display device.

In certain embodiments, a method includes receiving a probe record A database of records is searched in a first search using the probe record. A score is assigned to records in the database of records as a result of the first search such that a record that is more likely to be a match to the probe record is assigned a high score and a record that is less likely to be a match to the probe record is assigned a low score. A first set of candidate records, the first set of candidate records including records from the first search assigned the highest scores, is displayed at a display device of a computing device. An indication that a first candidate record in the first set of candidate records is not a match to the probe record is received. The database of records is searched in a second search using the probe record and the first candidate record. A score is assigned to records in the database of records as a result of the second search such that a record that is more likely to be a match to the probe record is assigned a high score and a record that is more likely to be a match to the first candidate record than a match to the probe record is assigned a low score. A second set of candidate records, the second set of candidate records including records from the second search assigned the highest scores, is displayed at the display device of the computing device.

In certain embodiments, a method includes receiving a set of candidate records at a computing device. The set of candidate records includes candidate records that are possible matches to a probe record, the candidate records in the set of candidate records each being assigned a score such that a candidate record that is more likely to be a match to the probe record is assigned a high score and a candidate record that is less likely to be a match to the probe record is assigned a low score. At least a first portion of the set of candidate records, including the candidate records assigned the highest scores, is displayed at a display device of the computing device. An indication that a first candidate record in the set of candidate records is not a match to the probe record is received. An indication that a second candidate record in the set of candidate records is similar to the probe record is received. A first search of the set of candidate records using the first candidate record is performed. A second search of the set of candidate records using the second candidate record is performed. A score assigned to a third candidate record in the set of candidate records is modified when the third candidate record is more likely to be a match to the first candidate record than a match to the probe record. A score assigned to a fourth candidate record in the set of candidate records is modified when the fourth candidate record is more likely to be a match to the second candidate record than a match to the probe record. At least a second portion of the set of candidate records including the candidate records assigned the highest scores is displayed at the display device of the computing device.

The details of one or more embodiments are set forth in the accompanying drawings and the description below. Other features, objects, and advantages will be apparent from the description and drawings, and from the claims.

BRIEF DESCRIPTION OF THE DRAWINGS

The included drawings are for illustrative purposes and serve only to provide examples of possible methods, apparatus, and systems for performing an operator-assisted iterative biometric search. These drawings in no way limit any changes in form and detail that may be made to embodiments by one skilled in the art without departing from the spirit and scope of the disclosure.

DETAILED DESCRIPTION

The invention relates to biometric search methods, apparatus, and systems, and in particular, to biometric search methods, apparatus, and systems using operator input for an operator-assisted iterative biometric search.

Embodiments of the disclosed methods, apparatus, and systems increase the effectiveness of biometric search engines. A biometric search may be performed iteratively, using operator input. For example, an operator may review a list of candidate images received from a biometric search in response to input of a probe image. The operator may mark candidate images as bearing a high resemblance to the probe image or a low resemblance to the probe image. The biometric search may then be repeated, with the knowledge of candidate images bearing a high resemblance or a low resemblance to the probe image. A new list of candidate images that bear a higher resemblance to the probe image is generated. The operator can repeat this process in a second, third, and further iterations, as needed, in an attempt to match the probe image to a candidate image. Using the disclosed methods, apparatus, and systems may yield a candidate image that matches the probe image, even when the probe image is of poor quality due to artifacts in the probe image, for example.

Figure 1A:
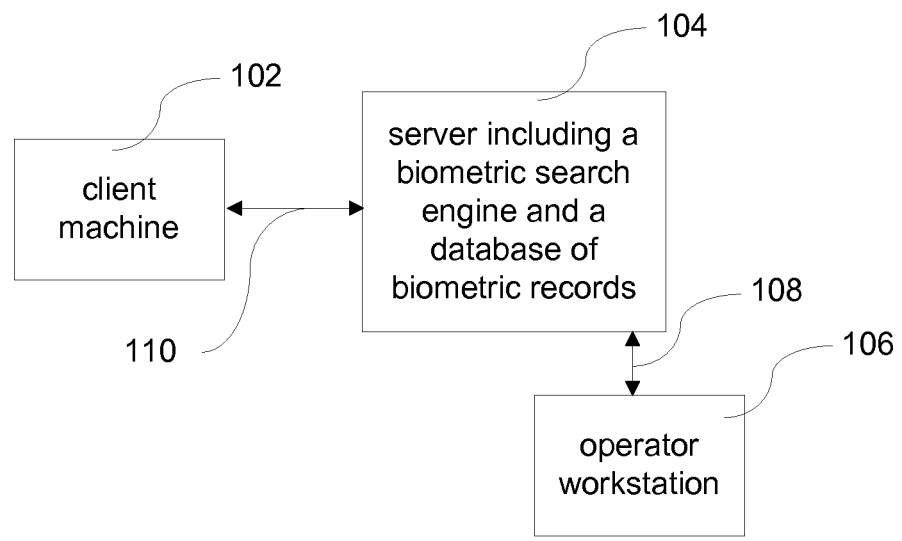
FIG. 1A is a schematic diagram of computer systems for biometric searches according to one or more embodiments of the present invention.

FIG. 1A is a schematic diagram of computer systems for biometric searches according to one or more embodiments of the present invention. The computer systems shown in FIG. 1A include a client machine 102, a server 104, and an operator workstation 106. The client machine 102 may be any number of computing devices, including a personal computer, a desktop computer, a laptop computer, or a network of computing devices, for example. The client machine 102 may include a display device such as a monitor, an input device such as a keyboard or a mouse, a processor, and a memory device, for example. The server 104 includes a biometric search engine and a database of biometric records. The term "server" is meant to include a computer system, including processing hardware and process space(s), and an associated storage system and/or database application. The server 104 may include multiple servers and/or multiple computing devices. The operator workstation 106 may be any number of computing devices, including a personal computer, a desktop computer, a laptop computer, or a mainframe computer terminal, for example. The operator workstation 106 is able to communicate with the server 104 over a private data network 108. The client machine 102 is able to communicate with the server 104 over a public data network 110, such as the Internet, for example.

The server 104 and the operator workstation 106 may be owned and operated by a government organization, such as the Federal Bureau of Investigation, for example. The client machine 102 may be owned and operated by a local police department or a private organization, for example.

In certain embodiments, the operator workstation 106 communicates with the server 104 over the private data network 108. In certain embodiments, the client machine 102 communicates with the server 104 over the network 110. Further descriptions of the computer systems shown in FIG. 1A are given below in the descriptions of the biometric search methods.

Figure 1B:
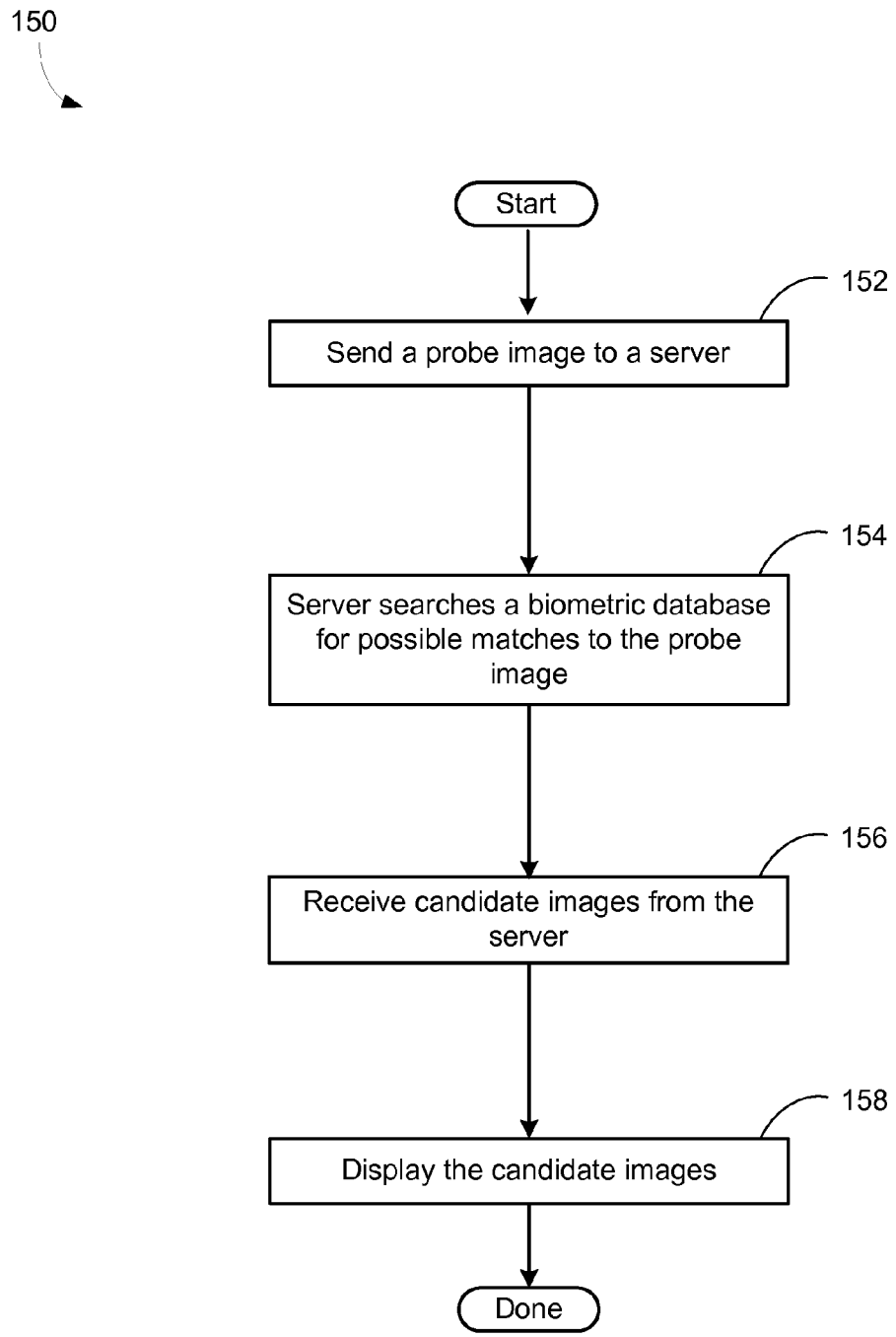
FIG. 1B is a flow diagram of a biometric search method 150.
Figure 1C:
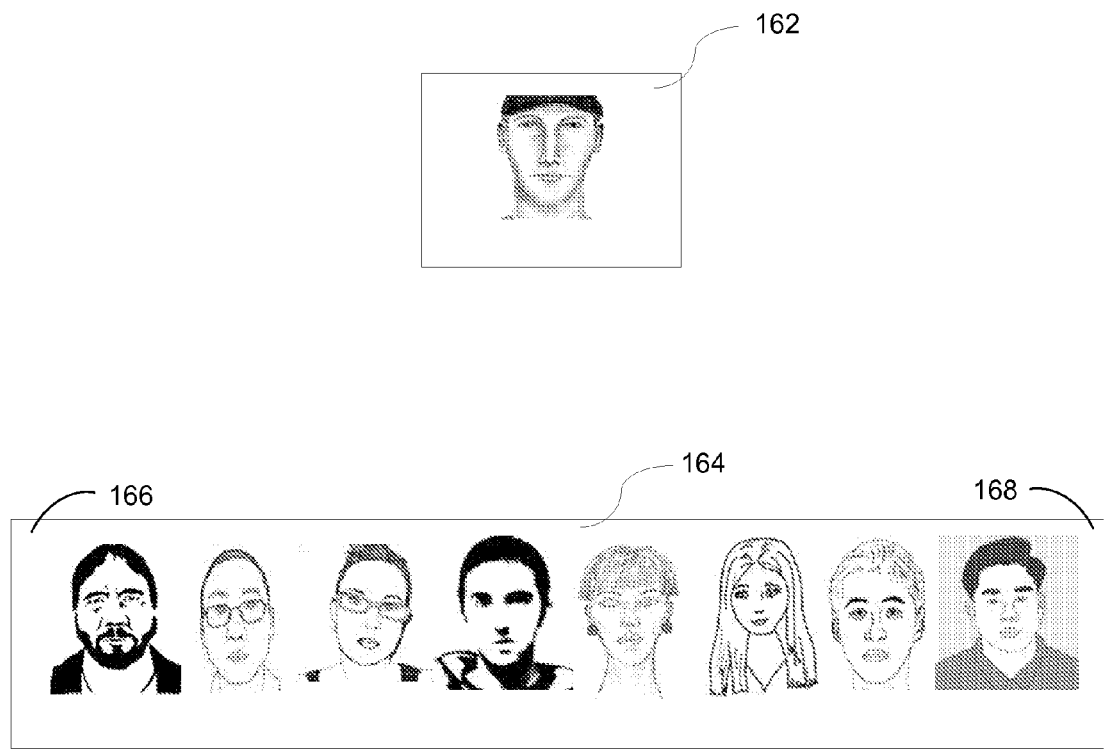
FIG. 1C shows images associated with a biometric search method.

FIG. 1B is a flow diagram of a biometric search method 150. The method 150 may be performed using the computer systems shown in FIG. 1A, for example. FIG. 1C shows images associated with a biometric search method.

At block 152 of the method 150, a probe image or record is sent to a server. The probe image may be sent from the operator workstation 106 to the server 104 over the private data network 108, for example. Alternatively, the probe image may be sent from the client machine 102 to the server 104 over the public data network 110, for example. The probe image may be any number of different types of images or biometric samples. For example, the probe image may be a facial image, an iris image, an ear image, a fingerprint image, or a palm print image.

The probe image 162 in FIG. 1C is an example of a facial image that may be used as a probe image. As a further example, the probe image may be a crime scene image, a latent fingerprint image, or a facial image recorded by a security camera. A law enforcement organization may wish to determine if the probe image matches an image in a biometric database of known criminals to determine the identity of a person in or the source of the probe image.

At block 154, the server searches a biometric database for possible matches to the probe image. The server may use a biometric search engine or other algorithm to determine if an image in the biometric database is a possible match to the probe image. The search output is a candidate image that is a possible match to the probe image or a list of candidate images that are possible matches to the probe image. In some implementations, each candidate image in a list of candidate images is assigned a score. For example, a candidate image that is more similar to the probe image may be assigned a higher score than a candidate image that is less similar to the probe image.

In some implementations, the candidate images are ordered according to their assigned scores. For example, candidate images that are assigned a higher score may be placed at the top of the list of candidate images. Candidate images that are assigned a lower score may be placed at the bottom of the list of candidate images.

The candidate list 164 in FIG. 1C is an example of a candidate list that may be generated by the server based on a search of a biometric database for matches to the probe image 162. Candidate images that bear a high similarity to the probe image and have high assigned scores may be placed at the top 166 of the candidate list. Candidate images that bear a low similarity to the probe image and have low assigned scores may be placed at the bottom 168 of the candidate list.

At block 156, candidate images are received from the server. All or some of the candidate images determined as being possible matches to the probe image may be sent from the server 104 to the operator workstation 106, for example.

At block 158, the candidate images are displayed. In some implementations, a portion of the candidate images in the candidate list are displayed. In some implementations, all the candidate images in the candidate list are displayed. The candidate images may be displayed on a display device of the operator workstation 106, for example. The candidate images may be reviewed by an operator at the operator workstation 106 or at the client machine 102. The process of an operator reviewing candidate images is also referred to as adjudication. The adjudication may result in a hit, that is, an unambiguous match of a candidate image to the probe image. The adjudication may also result in a number of candidate images that are similar to the probe image. The organization performing the biometric search may use the unambiguous match of a candidate image to the probe image or the candidate images that are similar to the probe image to determine the identity of the person in the probe image. For example, the candidate images may include other associated information so that they may be used for identification.

For example, a robbery scene security video may include an image of a face. A search of biometric databases that include images, using the image of the face, may yield several candidate images that are similar to the probe image. Using identification information associated with the candidate images, a law enforcement organization may compile a list of suspects for the robbery. These suspects may then be further screened, interviewed, and/or apprehended by law enforcement personnel.

Some biometric databases, such as those in possession of the Federal Bureau of Investigation or other law enforcement agencies, for example, include a large number of images or records. For example, a biometric database may include thousands, hundreds of thousands, or millions of images or records. In some instances, the quality of an image to be included in a biometric database of a law enforcement organization is regulated by standards of the United States, the European Union, or other international organization.

A search of such a biometric database may yield a candidate image that matches a probe image if the probe image is of good quality. This would allow a law enforcement organization to directly identify a suspect. For example, unambiguous identification of a suspect may be made by a search performed using a biometric database of hundreds of millions of fingerprint records if the probe image is a high quality set of fingerprints from all ten fingers. As another example, unambiguous identification of a suspect may be made by a search performed using a biometric database of hundreds of thousands of high quality mug shots if the probe image is a high resolution frontal mug shot photograph.

The quality of a probe image, however, can not be controlled in some cases. For example, probe images collected from a crime scene may include latent fingerprint images that are partial and smudged, iris images that are partial or with substantial eye gaze, or facial images that are of low resolution, at non-frontal pose angle, under poor lighting, or with strong facial expression. The law enforcement organization may want to use all of these probe images in searches of biometric databases to increase the chances that a suspect will be identified. For example, a law enforcement organization may cross-reference searches of different types of probe images to positively identify a suspect.

As another example, probe images collected from a crime scene may include two images of the same face. For example, the two facial images may have been collected with a security camera. Both of these facial images may be of low resolution. The law enforcement organization may want to use both of these probe images in searches of a facial image biometric database to increase the chances that a suspect will be identified. For example, a law enforcement organization may cross-reference searches of the two probe images to positively identify a suspect.

The accuracy of a search of a biometric database may decrease with decreasing probe image quality, however. Some low quality probe images may not include sufficient information for a biometric search engine to uniquely match a candidate image to the probe image. As a result, low quality probe images may require a large number of candidate images from a biometric database to be adjudicated by an operator. For example, an operator may need to adjudicate hundreds or even thousands candidate images before a match to the probe image is identified.

For example, a probe image may be a low resolution video image of a person taken with the person's face rotated with respect to the camera. This is also referred to as a facial image at a strong pose. A search of a biometric database with a biometric search engine may yield a candidate list that includes a large number of candidate images having a strong pose similar to the pose of the probe image. This may be caused by bias in the facial recognition algorithms used by the biometric search engine, for example.

As another example, a probe image may be a facial image with strong directional lighting at one side of the face. A search of a biometric database with a biometric search engine may yield a candidate list that includes a large number of candidate images having lighting similar to the lighting in the probe image.

As yet another example, a probe image may be a facial image with a strong expression. For example, the facial image may be face with a strong smile. A search of a biometric database with a biometric search engine may yield a candidate list that includes a large number of candidate images having a smile similar to the smile in the probe image.

Thus, the algorithm used by the biometric search engine to search a biometric database may be biased. For a probe image that is a facial image, instead of returning candidate images with similar facial features, the biometric search engine may return a candidate list that includes candidate images with the same artifacts as the probe image, such as pose, poor lighting, or expression, for example. A candidate image that is a match to the probe image may become obscured by the large number of candidate images with such artifacts.

Embodiments of the present invention provide methods, apparatus, and systems for reducing the bias of biometric searches by using operator assistance and performing iterative searches. Using the disclosed methods, apparatus, and systems may yield a candidate image that matches the probe image, even when the probe image is of poor quality due to artifacts in the probe image, for example.

Figure 2A:
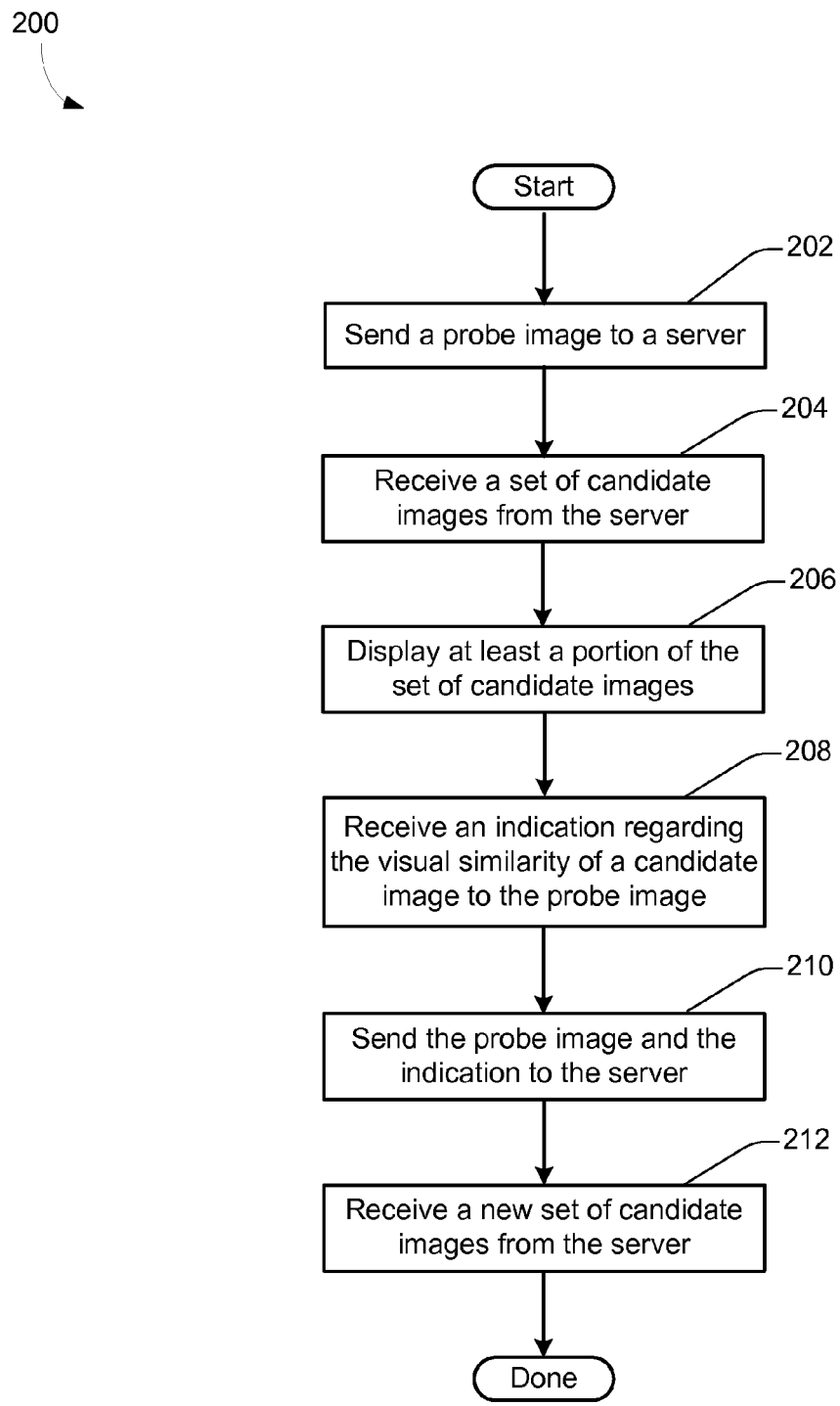
FIG. 2A is a flow diagram of an operator-assisted biometric search method 200 according to one or more embodiments of the present invention.
Figure 2B:
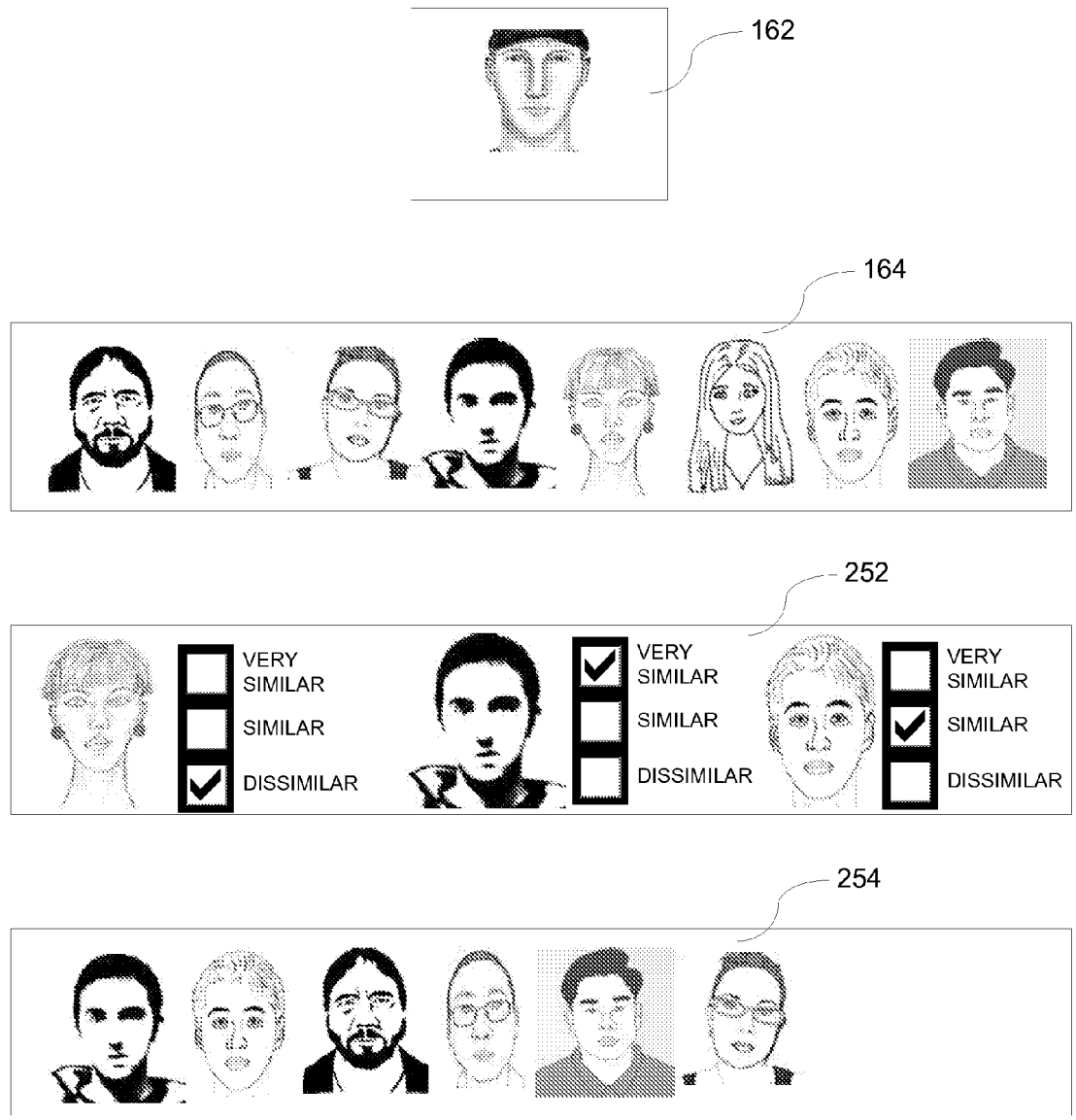
FIG. 2B shows images associated with an operator-assisted biometric search method according to one or more embodiments of the present invention.

FIG. 2A is a flow diagram of an operator-assisted biometric search method 200 according to one or more embodiments of the present invention. FIG. 2B shows images associated with an operator-assisted biometric search method according to one or more embodiments of the present invention. The method 200 may be performed using the computer systems shown in FIG. 1A, for example.

At block 202, a probe image or record is sent to a server. In some embodiments of the method 200, block 202 is similar to block 152 of the method 150 in FIG. 1B. The probe image may be sent from the operator workstation 106 to the server 104 over the private data network, for example. As noted above, the probe image may be a facial image, an iris image, an ear image, a fingerprint image, or a palm print image, for example. The probe image 162 in FIG. 2B is an example of a facial image that may be used as a probe image.

The server then searches images in a biometric database for possible matches to the probe image. In some embodiments of the method 200, this search process is similar to block 154 of the method 150. The server may use a biometric search engine or other algorithm to determine if an image in the biometric database is a possible match to the probe image. The search output is a candidate image that is a possible match to the probe image or a set of candidate images that are possible matches to the probe image.

At block 204, a set of candidate images is received from the server. In some embodiments of the method 200, block 204 is similar to block 156 of the method 150. All or some of the candidate images determined as being possible matches to the probe image may be received from the server. As noted above, in some embodiments each candidate image has an assigned a score. For example, a candidate image that is more similar to the probe image may be assigned a higher score by the biometric search engine than a candidate image that is less similar to the probe image. The further relevance of the score assigned to a candidate image or record is described below, in reference to the methods 300, 400, and 500 of an operator-assisted biometric search.

At block 206, at least a portion of the set of candidate images is displayed. In some embodiments of the method 200, block 206 is similar to block 158 of the method 150. In some embodiments, all of the candidate images in the set of candidate images are displayed. In some embodiments, a portion of the candidate images in the set of candidate images is displayed.

The candidate images may be displayed on a display device of the operator workstation 106, for example. The candidate list 164 in FIG. 2B is an example of a set of candidate images that may be received and displayed based on the search of a biometric database for matches to the probe image 162. An operator at the operator workstation may adjudicate the set of candidate images. For example, the operator may visually review each candidate image to determine if any of the candidate images are matches to the probe image.

At block 208, the operator provides feedback such that an indication regarding the visual similarity of a candidate image to the probe image is received. For example, when the operator does not identify a candidate image that is a likely match to the probe image in the displayed candidate images, the operator may indicate the visual similarity of a candidate image or images to the probe image. For example, for the three candidate images in the candidate images 252 in FIG. 2B, the operator may indicate that an image is "very similar," "similar," "or "dissimilar" to the probe image.

At block 210, the probe image and the indication of the visual similarity of a candidate image to the probe image are sent to the server. In some embodiments, the server uses the probe image and the indication to search the biometric database. Using the probe image and the information regarding a candidate image that is similar or dissimilar to the probe image, the biometric search engine may refine the output of a search. For example, by refining the output of the search of the biometric database, candidate images more likely to be a match to the probe image may be determined. A new set of candidate images may be generated by the search engine, in some embodiments. For example, the new set of candidate images may include new candidate images and candidate images from the first search. As another example, the new set of candidate images may include a candidate image that is a match to the probe image.

In some embodiments, the server uses the probe image and the indication to search the set of candidate images that was previously received from the server instead of searching the biometric database. After a search of the set of candidate images, the set of candidate images may be reordered such that candidate images that are more likely to be matches to the probe image and candidate images indicated by the operator to be similar to the probe image are moved to the top of the set of candidate images. Candidate images that are similar to candidate images indicated by the operator not to be similar to the probe image may be moved to the bottom of the set of candidate images. An example of a reordered set of candidate images are the candidate images 254 in FIG. 2B.

In some embodiments, blocks 208, 210, and 212 may be repeated when the operator does not identify a candidate image that is a likely match to the probe image in the displayed candidate images. Specific embodiments of the method 200 are described further in the methods 300, 400, and 500 of an operator-assisted biometric search.

Figure 3:
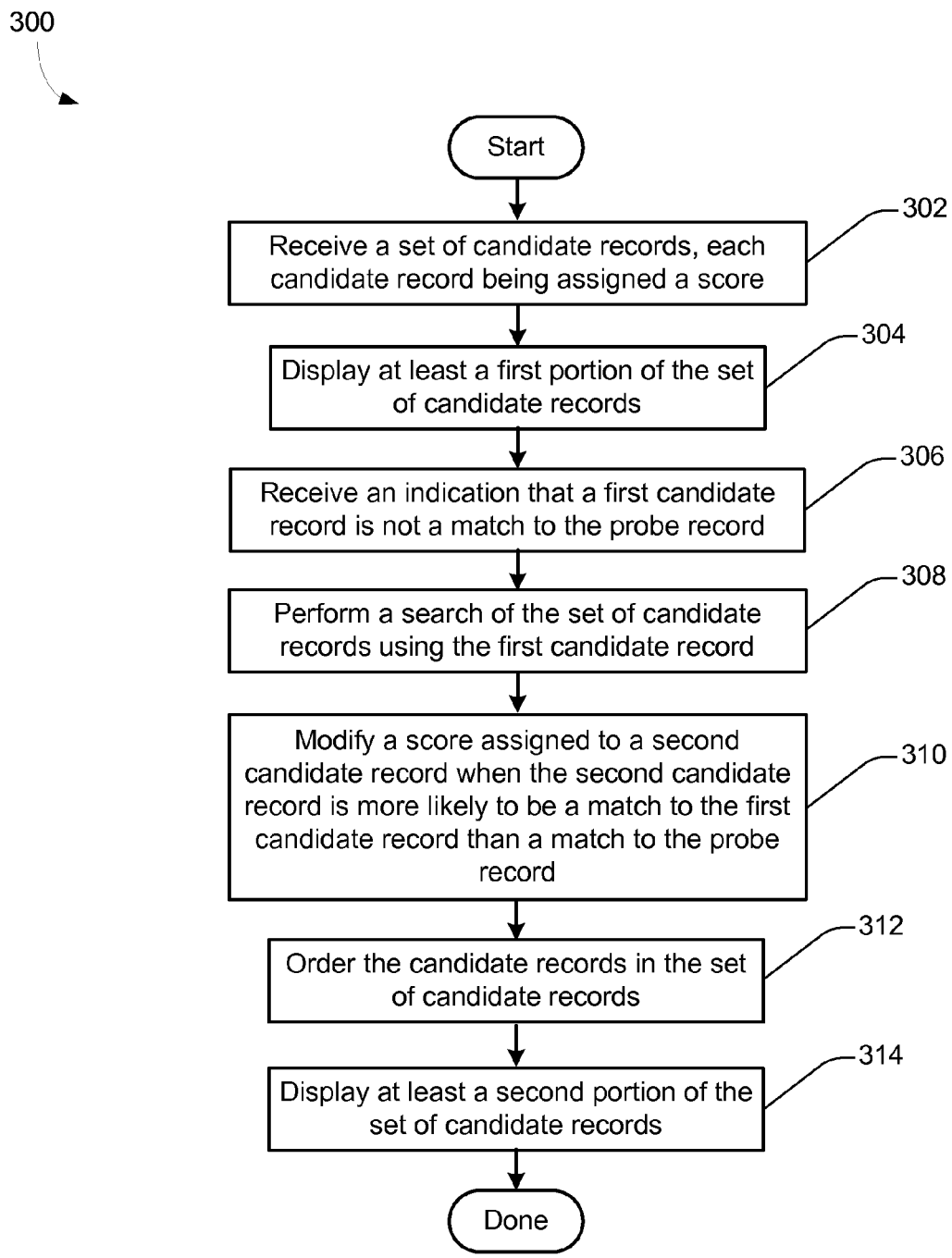
FIG. 3 is a flow diagram of an operator-assisted biometric search method 300 according to one or more embodiments of the present invention.

FIG. 3 is a flow diagram of an operator-assisted biometric search method 300 according to one or more embodiments of the present invention. The method 300 may provide a candidate record that is a match to a probe record even when the probe record is of poor quality, for example.

At block 302, a set of candidate records is received. In some embodiments, the set of candidate records include candidate records that are possible matches to a probe record. As noted above, the probe record and the candidate records may include an image, such as a facial image, an iris image, an ear image, a fingerprint image, or a palm print image. For example, when the probe record includes a facial image, the candidate records would be facial images that are possible matches to the probe record facial image. In some embodiments, the set of candidate records may be received at a computing device.

The set of candidate records may be received at the client machine 102 from the server 104 over the data network 110, as shown in FIG. 1A, for example. The server may have searched a biometric database after receiving a probe record. After receiving the set of candidate records, the client machine may store the set of candidate records on or with a memory device. When the client machine stores the set of candidate records, the client machine may not need to communicate any further with the server in the method 300, in some embodiments.

In some embodiments, each candidate record in the set of candidate records is assigned a score based on the similarity of a candidate record to a probe record. For example, a candidate record that is more likely to be a match to the probe record may be assigned a high score by a biometric search engine. A candidate record that is less likely to be a match to the probe record may be assigned a low score by a biometric search engine.

In some embodiments, the set of candidate records includes a large number of candidate records. For example, the set of candidate records may include hundreds or thousands of candidate records. The large number of candidate records helps to ensure that a candidate record that matches the probe record is included in the set of candidate records. For example, when the probe record is of low quality, including a large number of candidate records in the set of candidate records helps to ensure that a candidate record that matches the probe record is included in the set of candidate records. If, for example, the probe record is a facial image with a strong pose, a set of candidate records that is limited to a small number of candidate records may include many candidate records with similar strong poses but not include the candidate record that matches the probe record due to the matching candidate record not having a strong pose as in the probe record.

In some embodiments, the candidate records in the set of candidate records are ordered before being displayed. In some embodiments, the candidate records in the set of candidate records are ordered in the order of candidate records assigned high scores to candidate records assigned low scores.

At block 304, at least a first portion of the set of candidate records is displayed. In some embodiments, the portion of the set of candidate records includes candidate records that have been assigned the highest scores. For example, the set of candidate records may include over ten thousand candidate records that have been determined as being possible matches to the probe record as a result of a biometric search within a biometric database that includes ten million records. An operator would not be capable of adjudicating such a large number of candidate records in the set of candidate records. Therefore, a portion of the set of candidate records is displayed for adjudication by the operator, in some embodiments. For example, the twenty-five or fifty candidate records with the highest scores may be displayed. The twenty-five or fifty candidate records with the highest scores would be the candidate records that the biometric search engine determined to be the most similar to the probe record. The operator may then adjudicate the displayed candidate records.

In some embodiments, the portion of the set of candidate records is displayed at a display device of a computing device. For example, the computing device may be the client machine 102 shown in FIG. 1A. The computing device may also be the operator workstation 106 shown in FIG. 1A. The processor of the computing device, such as the client machine 102, for example, may be capable of performing all or some of the process operations of the method 300.

At block 306, an indication that a first candidate record in the set of candidate records is not a match to the probe record is received. For example, after adjudicating the displayed candidate records, when the operator does not identify a candidate record that matches the probe record, the operator may indicate that one or more candidate records are not similar to the probe record. The indication may be any number of different indications. For example, the indication may be a rating from 1 to 10 of the similarity or dissimilarity of a candidate record to the probe record, with 10 being very dissimilar. As another example, the indication may be "very similar," "similar," "or "dissimilar," as noted above with the candidate images 252 in FIG. 2B. The first candidate record may be indicated to not be a match to the probe record with a rating of 10 or being "dissimilar," for example.

Candidate records that are not matches to the probe record may be included in the set of candidate records due to bias in the biometric search engine. For example, such candidate records may be included in the set of candidate records because of similarities in environmental factors at the time of the capture of the probe record even if the candidate record is not otherwise similar to the probe record. As noted above, for a probe record including a facial image, the image may be of low resolution, at non-frontal pose angle, under poor lighting, or with strong facial expression. For example, a probe image may be a low resolution video image of a person taken with the person's face rotated with respect to the camera. This is also referred to as a facial image at a strong pose. A search of the biometric database with the biometric search engine may yield a set of candidate records that includes a large number of candidate records having a strong pose similar to the pose of the probe record but otherwise not similar to the probe record.

In some embodiments, an indication that one or more candidate records are not matches to the probe record is received. As noted above, the twenty-five or fifty most similar candidate records may be displayed. From these twenty-five or fifty candidate records, the operator may identify only one, a couple, or ten candidate records that are not matches to the probe record, for example.

In some embodiments, the score assigned to the first candidate record is modified. In some embodiments, the score assigned to the first candidate record is modified by setting the score assigned to the candidate record to zero. This would move the first candidate record to the bottom of the set of candidate records when the set of candidate records is ordered from candidate records assigned high scores to candidate records assigned low scores. A candidate record with a score of zero would be at the bottom of the set of candidate records, indicating that the candidate record is not likely to be a match to the probe record. Thus, setting the score of a candidate record to zero effectively removes the candidate record from the set of candidate records.

At block 308, a search of the set of candidate records using the first candidate record is performed. For example, the set of candidate records may be searched with a biometric search engine to determine a candidate record that is a possible match to the first candidate record.

At block 310, a score assigned to a candidate record in the set of candidate records that is more likely to be a match to the first candidate record than a match to the probe record is modified. In some embodiments, the score assigned to such a candidate record is modified by decreasing the score. For example, if a candidate record had been assigned a score of 100, the score may be decreased to 50 if the candidate record is more likely to be a match to the first candidate record than a match to the probe record. This would move the candidate record down in the set of candidate records, indicating that the candidate record is less likely to be a match to the probe record.

In some embodiments, the score assigned to a candidate record that is more likely to be a match to the first candidate record than a match to the probe record is modified by setting the score assigned to the candidate record to zero. This would move the candidate record to the bottom of the set of candidate records when the set of candidate records is ordered from candidate records assigned high scores to candidate records assigned low score, as described above.

In some embodiments, it is determined that one or more candidate records are more likely to be matches to the first candidate record than a match to the probe record. The scores assigned to all of these candidate records may be modified.

In some embodiments, when an indication that one or more candidate records are not matches to the probe is received, a search is performed in the set of candidate records for each of the one or more candidate records. For example, at block 306, an indication that two candidate records in the set of candidate records are not a matches to the probe record may be received. Then, at block 308, a search of the set of candidate records using both of the candidate records may be performed.

At block 312, the candidate records in the set of candidate are ordered. In some embodiments, the candidate records in the set of candidate records are ordered in the order of candidate records assigned high scores to candidate records assigned low scores. As described above, a candidate record having a score of zero would be at the bottom of the set of candidate records.

At block 314, at least a second portion of the set of candidate records is displayed. In some embodiments, the portion of the set of candidate records includes candidate records that have been assigned the highest scores. By assigning candidate records that are not likely to be matches to the probe record a score of zero, these candidate records may not be displayed when there are hundreds or thousands of candidate records in the set of candidate records, for example. Further, a candidate record matching the probe record may be displayed after candidate records that are unlikely matches are removed from the portion of the set of candidate records displayed. Thus, the candidate records in the second portion of the set of candidate records displayed may have more similarity to the probe record than the candidate records displayed in the first portion of the set of candidate records. A candidate record with a modified higher score that was not previously displayed may be displayed, in some embodiments. As noted above, the portion of the set of candidate records may be displayed at the display device of the computing device.

If, however, the operator does not identify a candidate record that matches the probe record in the displayed portion of the set of candidate records, blocks 306 though 314 may be repeated. For example, in the second portion of candidate records displayed, the operator may determine which candidate records are not matches to the probe record. An indication that a candidate record is not a match to the probe record would be received, starting the process again at block 306. The process may be repeated by the operator multiple times until the operator identifies a candidate record or records that are likely to be matches to the probe record.

Figure 4:
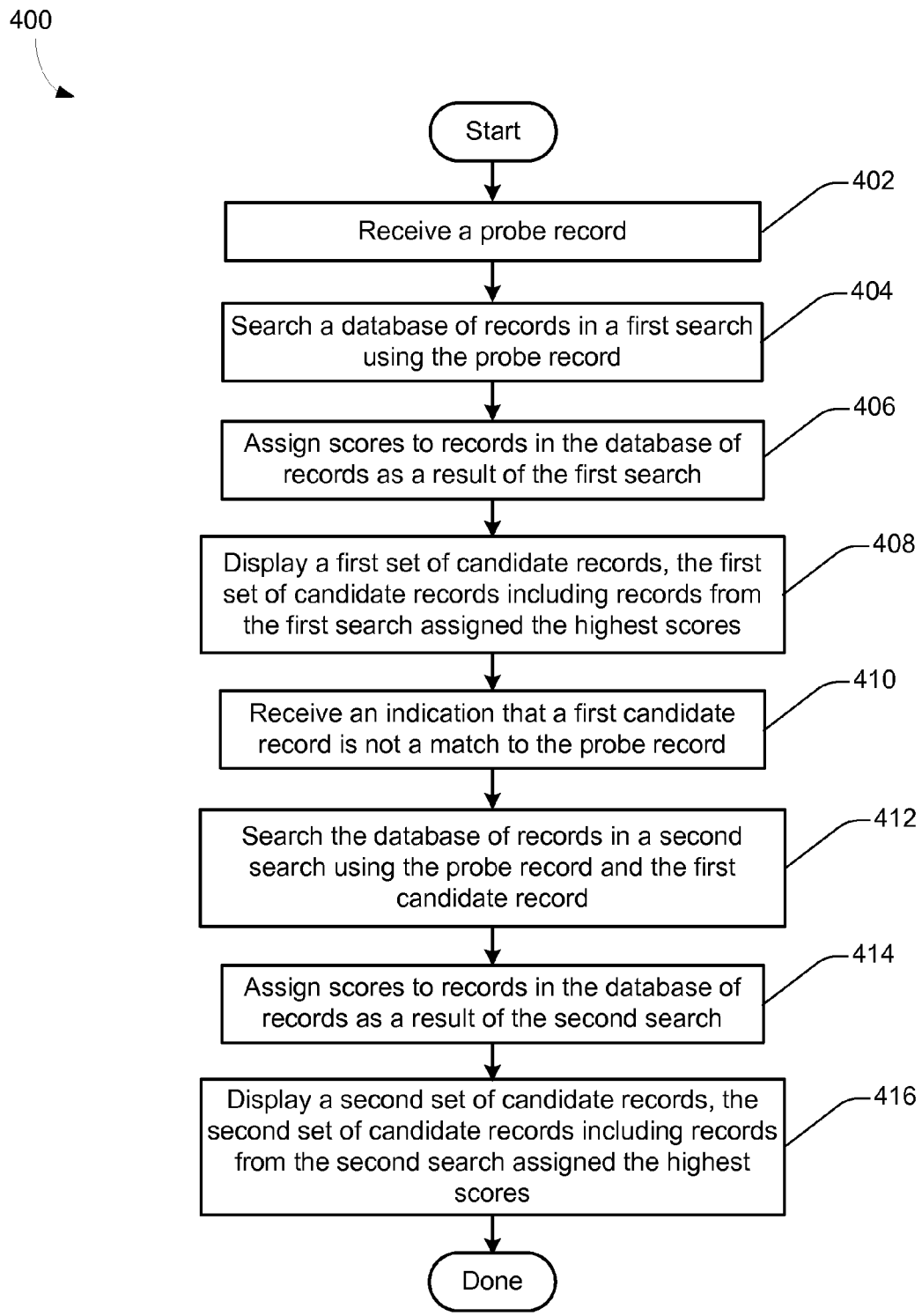
FIG. 4 is a flow diagram of an operator-assisted biometric search method 400 according to one or more embodiments of the present invention.

FIG. 4 is a flow diagram of an operator-assisted biometric search method 400 according to one or more embodiments of the present invention. The method 400 may provide a candidate record that is a match to a probe record even when the probe record is of poor quality, for example.

Some embodiments of the method 400 are similar to embodiment of the method 300 in FIG. 3. In the method 400, however, instead of performing a search of the set of candidate records using a first candidate record, as in block 308 of the method 300, a search of a database of candidate records is performed using a first candidate record. For example, method 300 may be implemented at the client machine 102 shown in FIG. 1A. The client machine 102 may receive a set of candidate records from the server 104. A search with the first candidate record is performed using the set of received candidate records. After the client machine 102 receives the set of candidate records, it may not need to communicate any further with the server 104. The method 400 may be implemented at the server 104 and the operator workstation 106 shown in FIG. 1A, for example. The server 104 may search a biometric database and determine candidate records that are possible matches to a probe record. Workstation 106 may display the candidate records. The server 104 may then search the biometric database again and determine new candidate records that are possible matches to a probe record. The method 400 is described further, below.

At block 402, a probe record is received. The probe record may be a number of different types of probe records, as described above. For example, the probe record may include an image such as a facial image, an iris image, an ear image, a fingerprint image, or a palm print image.

At block 404, a database of records is searched using the probe record. As noted above, a database of records may include millions of records. The database may be a database in possession of the Federal Bureau of Investigation, for example. A biometric search engine may search records in the database to determine possible matches to the probe record.

At block 406, scores are assigned to records in the database of records as a result of the first search. In some embodiments, a record that is more likely to be a match to the probe record is assigned a high score by the biometric search engine. A record that is less likely to be a match to the probe record is assigned a low score by the biometric search engine.

In some embodiments, scores are assigned to the top scoring records, according to the biometric search engine, in the database of records as a result of the first search. For example, the top 5000 or the top 10,000 scoring records may be assigned a score, and the remainder of the records in the database may be ignored. In some embodiments, a score is assigned to the each record in the database of records as a result of the first search.

In some embodiments, the records are ordered before being displayed. In some embodiments, the records are ordered in the order of records assigned high scores to records assigned low scores.

At block 408, a first set of candidate records is displayed. In some embodiments, the first set of candidate records includes the records from the first search assigned the highest scores. Thus, candidate records that are more likely to be matches to the probe record may be displayed. Records that are possible matches to the probe record are also referred to as candidate records.

In some embodiments, the portion of the set of candidate records is displayed at a display device of a computing device. The computing device may be the operator workstation 106 shown in FIG. 1A, for example. The computing device may also be the client machine 102 shown in FIG. 1A.

At block 410, an indication that a first candidate record in the first set of displayed candidate records is not a match to the probe record is received. As noted above, the candidate records that are displayed may not include a match or a likely match to the probe record. The operator may then indicate that one or more candidate records are not matches to the probe record, for example.

At block 412, the database of records is searched in a second search using the probe record and the first candidate record. As noted above, a biometric search engine may search records in the database to determine possible matches to the probe record. The biometric search engine may also search records in the database to determine possible matches to the first candidate record.

At block 414, scores are assigned to records in the database of records as a result of the second search. In some embodiments, a record that is more likely to be a match to the probe record is assigned a high score and a record that is more likely to be a match to the first candidate record than a match to the probe record is assigned a low score. One or more records that are more likely to be matches to the first candidate record than matches to the probe record may be determined as a result of the second search.

In some embodiments, scores are assigned to the top scoring records, according to the biometric search engine, in the database of records as a result of the second search. For example, the top 5000 or the top 10,000 scoring records may be assigned a score, and the remainder of the records in the database may be ignored. In some embodiments, a score is assigned to the each record in the database of records as a result of the first search.

In some embodiments, the records are ordered before being displayed. In some embodiments, the records are ordered in the order of records assigned high scores to records assigned low scores.

At block 416, a second set of candidate records is displayed. In some embodiments, the second set of candidate records includes the records from the second search assigned the highest scores. As described above, by displaying the records that have been assigned the highest scores, a candidate record that matches the probe record may be displayed. In some embodiments, the second set of candidate records is displayed at the display device of the computing device.

When, however, a candidate record or records are not displayed that are possible matches to the probe record, blocks 410 though 414 may be repeated. For example, for the second set of candidate records that is displayed, the operator may determine which candidate record or records are not matches to the probe record. An indication that a candidate record is not a match to the probe record is received, starting the process again at block 410. The process may be repeated by the operator multiple times until the operator identifies a candidate record or records that are likely matches to the probe record.

In some embodiments, when indications that one or more candidate records are not matches to the probe have been received, a search is performed by the biometric search engine in the database of records for each of the one or more candidate records. For example, at block 410, an indication that a second candidate record in the first set of displayed candidate records is not a match to the probe record may be received. The database of records may searched in a third search using the probe record and the second candidate record. Alternatively, the second search may include searching the database of records using the probe record, the first candidate record, and the second candidate record.

In some embodiments, a score assigned to a first record in the database of records is modified as a result of a third search. In some embodiments, modifying the score the score assigned to a first record in the database of records as a result of the third search includes decreasing the score of the first record when the first record is more likely to be a match to the second candidate record than a match to the probe record.

The output of the second search of the database of records may be combined with the output of the first search of the database of records, in some embodiments. For example, a candidate record that is in both the first set of candidate records and the second set of candidate records may be assigned a high score. As another example, a candidate record that is determined as not being a likely match to the probe record, such as the first candidate record, may be excluded from the second set of candidate records.

Figure 5:
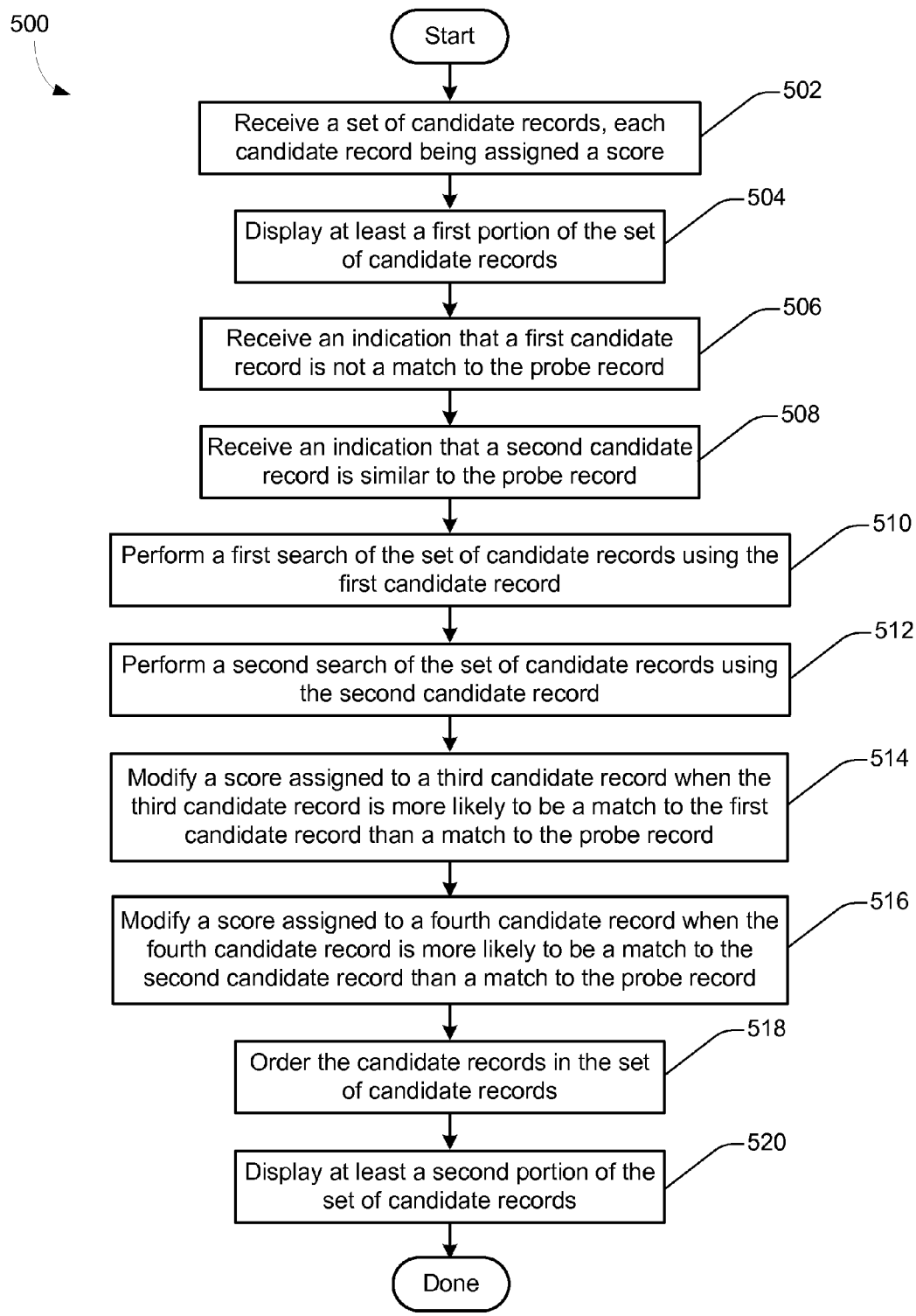
FIG. 5 is a flow diagram of an operator-assisted biometric search method 500 according to one or more embodiments of the present invention.

FIG. 5 is a flow diagram of an operator-assisted biometric search method 500 according to one or more embodiments of the present invention. The method 500 may provide a candidate record that is a match to a probe record even when the probe record is of poor quality, for example.

Some embodiments of the method 500 are similar to the method 300 in FIG. 3, with the additional operations of receiving an indication that a candidate record is similar to the probe record and performing a search in the set of candidate records with the similar candidate record.

At block 502, a set of candidate records is received. In some embodiments, block 502 is similar to block 302 in the method 300. In some embodiments, the set of candidate records includes candidate records that are possible matches to a probe record. As noted above, the probe record and the candidate records may include an image, such as a facial image, an iris image, an ear image, a fingerprint image, or a palm print image. In some embodiments, the set of candidate records may be received at a computing device. In some embodiments, each candidate record in the set of candidate records is assigned a score based on the similarity of a candidate record to the probe record.

At block 504, at least a first portion of the set of candidate records is displayed. In some embodiments, block 504 is similar to block 304 in the method 300. In some embodiments, the portion of the set of candidate records includes candidate records that have been assigned the highest score. In some embodiments, the portion of the set of candidate records is displayed at a display device of the computing device.

At block 506, the operator provides an indication that a first candidate record in the set of candidate records is not a match to the probe record. In some embodiments, block 506 is similar to block 306 in the method 300. In some embodiments, an indication that one or more candidate records that are not likely matches to the probe record is received. For example, after adjudicating the displayed candidate records, the operator may indicate that one or more candidate records are not likely matches to the probe record. The indication may be any number of different indications, as described above.

At block 508, an indication that a second candidate record in the set of candidate records is similar to the probe record is received. For example, after adjudicating the displayed candidate records, the operator may indicate that one or more candidate records are similar to the probe record. Such a candidate record may include a candidate record that is similar the probe record, but does not include an artifact that is present in the probe record, for example. For example, the probe record may include a facial image at a strong angle. The set of candidate records may include a number of facial images at a strong angle and a number of facial images not at a strong angle but otherwise similar to the probe image. The second candidate record may include an image of a face with facial features that are similar to facial features in the probe record, but not at a strong angle, for example.

The received indication may be any number of different indications. For example, the indication may be a rating from 1 to 10 of the similarity or dissimilarity of a candidate record to the probe record, with 1 being very similar. As another example, the indication may be "very similar," "similar," "or "dissimilar," as noted above with the candidate images 252.

The second candidate record may be indicated to be similar to the probe record with a rating of 1 or being "very similar," for example.

At block 510, a first search of the set of candidate records using the first candidate record is performed. In some embodiments, block 510 is similar to block 308 in the method 300. For example, the set of candidate records may be searched with a biometric search engine to determine a candidate record that is a possible match to the first candidate record.

At block 512, a second search of the set of candidate records using the second candidate record is performed. For example, the set of candidate records may be searched with a biometric search engine to determine a candidate record that is a possible match to the second candidate record.

At block 514, a score assigned to a candidate record in the set of candidate records that is more likely to be a match to the first candidate record than a match to the probe record is modified. In some embodiments, block 514 is similar to block 310 in the method 300. In some embodiments, the score assigned to such a candidate record is modified by decreasing the score. In some embodiments, the score assigned to such a candidate record is modified by setting the score assigned to the candidate record to zero.

At block 516, a score assigned to a candidate record in the set of candidate records that is more likely to be a match to the second candidate record than a match to the probe record is modified. In some embodiments, the score assigned to such a candidate record is modified by increasing the score. Thus, possible matches to the candidate record similar to the second candidate record are given higher scores. This process operation may help to overcome bias in the biometric search engine due to an artifact present in the probe record. For example, a fourth candidate record that includes a facial image may be very similar to the probe record, but at a different pose than the image of the probe record. Block 516 serves to increase the score assigned to a candidate record that is similar to the fourth candidate record because the candidate record could be a match to the probe record.

At block 518, the candidate records in the set of candidate are ordered. In some embodiments, block 518 is similar to block 312 in the method 300. In some embodiments, the candidate records in the set of candidate records are ordered in the order of candidate records assigned high scores to candidate records assigned low scores.

At block 520, at least a second portion of the set of candidate records is displayed. In some embodiments, block 520 is similar to block 314 in the method 300. In some embodiments, the portion of the set of candidate records includes candidate records that have been assigned the highest score. As noted above, the portion of the set of candidate records is displayed at a display device of the computing device, in some embodiments.

The method 500 increases the scores of candidate records that are similar to a candidate record that has been indicated to be similar to the probe record, which would move such candidate records towards the top of the set of candidate records. Candidate records that are likely matches to a candidate record that is not a match to the probe record are moved towards the bottom of the set of candidate records. Thus, the candidate records in the portion of the set of candidate records displayed may have more similarity to the probe record, for example. A candidate record that matches the probe record may also be displayed.

If, however, the operator does not identify a candidate record that matches the probe record in the displayed second portion of the set of candidate records, blocks 506 though 520 may be repeated. For example, in the displayed second portion of candidate records, the operator may determine which candidate records are not matches to the probe record. An indication that a candidate record is not a match to the probe record is received, starting the process again at block 506. The process may be repeated by the operator multiple times until the operator identifies a candidate record or records that are likely matches to the probe record.

The methods described above may be implemented by various types of hardware, software, firmware, etc. For example, some embodiments may be implemented, at least in part, by machine-readable media that include program instructions, state information, etc., for performing various processes described herein. Examples of program instructions include both machine code, such as produced by a compiler, and files containing higher-level code that may be executed by a computing device using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM").

A number of embodiments of the invention have been described. Nevertheless, it will be understood that various modifications may be made without departing from the spirit and scope of the invention.

What is claimed is:

1. A method comprising:
    receiving, at a computing device, a set of candidate records, the set of candidate records including candidate records that are possible matches to a probe record, the candidate records in the set of candidate records each being assigned a score such that a candidate record that is more likely to be a match to the probe record is assigned a high score and a candidate record that is less likely to be a match to the probe record is assigned a low score;
    displaying, at a display device of the computing device, at least a first portion of the set of candidate records including the candidate records assigned the highest scores;
    receiving an indication that a first candidate record in the set of candidate records is not a match to the probe record;
    receiving an indication that a second candidate record in the set of candidate records is similar to the probe record;
    performing a first search of the set of candidate records using the first candidate record;
    performing a second search of the set of candidate records using the second candidate record;
    modifying a score assigned to a third candidate record in the set of candidate records when the third candidate record is more likely to be a match to the first candidate record than a match to the probe record;
    modifying a score assigned to a fourth candidate record in the set of candidate records when the fourth candidate record is more likely to be a match to the second candidate record than a match to the probe record; and
    displaying, at the display device of the computing device, at least a second portion of the set of candidate records including the candidate records assigned the highest scores.

2. The method recited in claim 1, wherein the probe record and the candidate records include an image, and wherein the image is selected from the list consisting of: a facial image, an iris image, an ear image, a fingerprint image, and a palm print image.

3. The method recited in claim 1, further comprising:
ordering the candidate records in the set of candidate in the order of candidate records having high scores to candidate records having low scores.

4. The method recited in claim 1, wherein modifying the score assigned to the third candidate record includes decreasing the score.

5. The method recited in claim 1, wherein modifying the score assigned to the third candidate record includes modifying the score to be zero to effectively remove the third candidate record from the set of candidate records.

6. The method recited in claim 1, wherein modifying the score assigned to the fourth candidate record includes increasing the score.

7. A method comprising:
receiving, at a computing device, a database of candidate records, the database including candidate records that are possible matches to a probe record, the candidate records in the database each being assigned a score such that a candidate record that is more likely to be a match to the probe record is assigned a higher score and a candidate record that is less likely to be a match to the probe record is assigned a lower score;
displaying, at a display device of the computing device, at least a first portion of the database including the candidate records assigned the highest scores;
receiving an indication from an operator of a computing device that a first candidate record in the database is not likely a match to the probe record;
receiving an indication from an operator of a computing device that a second candidate record in the database is similar to the probe record;
performing a first search of the database using the first candidate record;
performing a second search of the database using the second candidate record;
modifying a score assigned to a third candidate record in the database when the third candidate record is more likely to be a match to the first candidate record than a match to the probe record;
modifying a score assigned to a fourth candidate record in the database when the fourth candidate record is more likely to be a match to the second candidate record than a match to the probe record; and
displaying, at the display device of the computing device, at least a second portion of the database including the candidate records assigned the highest scores.

8. The method recited in claim 7, wherein the probe record and the database includes an image, and wherein the image is selected from the list consisting of: a facial image, an iris image, an ear image, a fingerprint image, and a palm print image.

9. The method recited in claim 7, further comprising:
ordering the candidate records in the database in the order of candidate records having higher scores to candidate records having lower scores.

10. The method recited in claim 7, wherein modifying the score assigned to the third candidate record includes decreasing the score.

11. The method recited in claim 7, wherein modifying the score assigned to the third candidate record includes modifying the score to be zero to effectively remove the third candidate record from the database.

12. The method recited in claim 7, wherein modifying the score assigned to the fourth candidate record includes increasing the score.

13. A computing device comprising:
a display device;
an input device; and
a processor, the processor configured to:
receive a database of candidate records, the database including candidate records that are possible matches to a probe record, the candidate records in the database each being assigned a score such that a candidate record that is more likely to be a match to the probe record is assigned a higher score and a candidate record that is less likely to be a match to the probe record is assigned a lower score;
display, at the display device, at least a first portion of the database including the candidate records assigned the highest scores;
receive an indication from an operator of the computing device that a first candidate record in the database is not likely a match to the probe record;
receive an indication from an operator of the computing device that a second candidate record in the database is similar to the probe record;
perform a first search of the database using the first candidate record;
perform a second search of the database using the second candidate record;
modify a score assigned to a third candidate record in the database when the third candidate record is more likely to be a match to the first candidate record than a match to the probe record;
modify a score assigned to a fourth candidate record in the database when the fourth candidate record is more likely to be a match to the second candidate record than a match to the probe record; and
display, at the display device, at least a second portion of the database including the candidate records assigned the highest scores.

* * * * *